Nov. 27, 1928.
I. E. LITTEN
1,693,281
SNUBBER
Filed Nov. 12, 1925
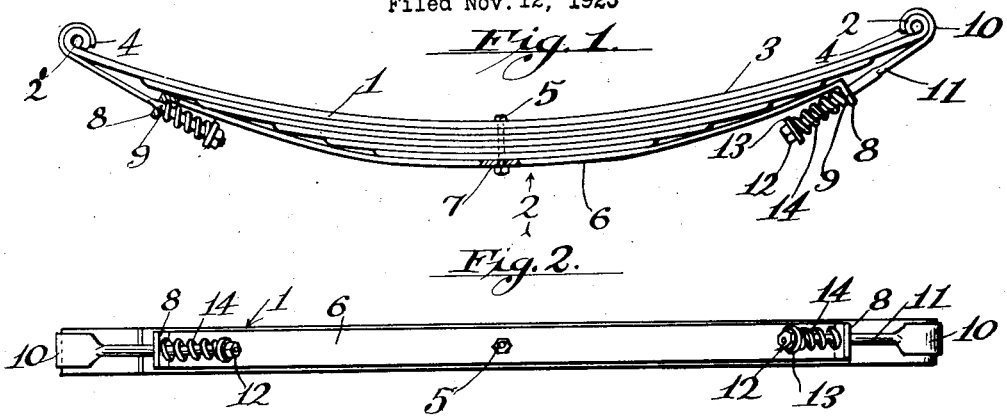
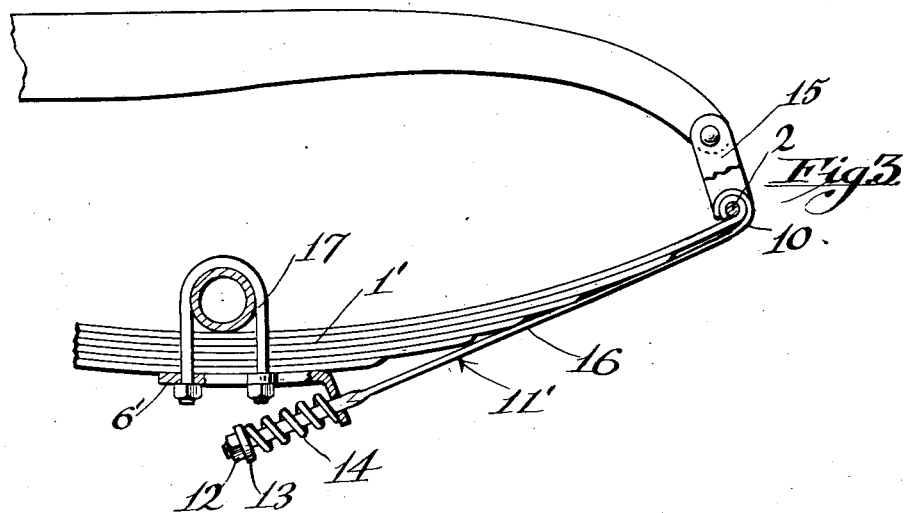
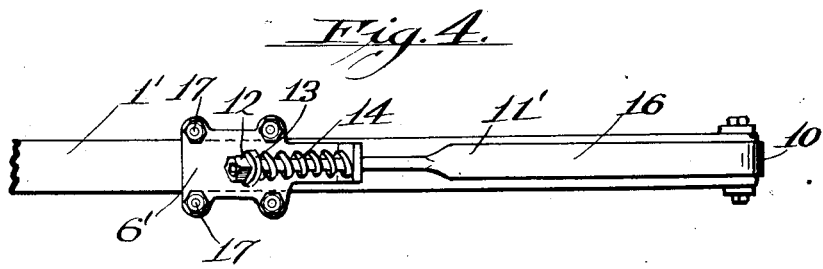
Inventor
Ira E. Litten
by Hazard and Miller
Attorneys.
Witness:

Patented Nov. 27, 1928.

1,693,281

UNITED STATES PATENT OFFICE.

IRA E. LITTEN, OF ORANGE, CALIFORNIA.

SNUBBER.

Application filed November 12, 1925. Serial No. 68,569.

My invention is a snubber for vehicles.

My invention comprises a snubber suitable for attachment to curved leaf springs of the elliptical or semi-elliptical type.

An object of my invention is to prevent excessive flexing of leaf springs by incorporating in part an additional resistance and in part an absolute block to their further flexing or bending.

Another object of my invention is to allow normal action of the springs without my snubber affecting such action materially and to allow the spring to be compressed, that is straightened to its limit without effecting further movement but on the rebound to prevent the upthrow of a vehicle due to the action of the spring in flexing same past its normal position.

My snubber broadly comprises an attachment on a leaf spring preferably of an elliptical or semi-elliptical type of a strap which is rigidly secured to part of the spring and a hook having an extension bar connected to one of the spring shackles or pivot pins. The strap and extension bar have relative sliding motion one in relation to the other and allow the spring to straighten out but are adjusted to prevent undue flexing by limiting such flexure of the spring leaves.

More specifically my snubber comprises a strap which may be attached to the center part of a spring of the multiple leaf type, such spring having a permanent curve. A hook is engaged over one end of the spring, such as a spring shackle or pivot pin and the bar passes through an aperture in an offset flange of the strap and a coil compression spring is secured between the flange and the end of the bar, therefore the coil spring resists the flexure of the vehicle springs and when this becomes excessive there is a rigid and unstretchable connection made between the center of the vehicle spring and the shackle through the medium of the strap, the bar and the hook.

My invention will be more readily understood from its application as shown in the drawings, in which;

Figure 1 is a side view of my elliptical spring showing a pair of my snubbers attached to the opposite ends of the spring.

Fig. 2 is a bottom view of the spring taken in the direction of the arrow 2 of Fig. 1.

Fig. 3 is a side view of another type of spring, such as quarter elliptical type of spring having one end curved.

Fig. 4 is a bottom view of the spring of Fig. 3.

Referring particularly to the construction of Figs. 1 and 2, a vehicle spring is designated by the numeral 1 and is of a multi-spring type shown as forming a semi-cylindrical spring having pivot pins 2 and 2' at opposite ends, the main leaf 3 having an eye 4 fitting over such pins, the remaining leaves being clamped to each other by a bolt 5.

My snubber attachment comprises an elongated strap 6 having an aperture 7 therethrough at its center, through which passes the bolt 5 and clamping the strap rigidly to the shortest, that is the lowermost leaf of the spring in this case. Each end of the strap has an offset flange 8 with an aperture 9 therethrough.

The component parts of the snubber comprise a hook 10 formed on the end with an extension bar 11, the hook being adapted to fit over the eye 4 and thereby enclosing the pivot pins 2 and 3. This bar passes through the aperture 9 in the strap and has a nut 12 screw threaded on the end of the bar.

A washer 13 forms an abutment between which and the flange 8 a compression spring 14 of the coil type is positioned. The nut 13 may be adjusted to regulate the distance between the flange 8 and the washer 12 and also to vary the compression of the coil spring 14.

In the type of spring shown in Figs. 3 and 4, the elements of the spring 1' may be considered similar to those of Figs. 1 and 2, and in this case a spring shackle 15 is shown and the pin 2 being considered the pin on the lower end of the spring shackle. The strap 6' in this illustration is shown as of much shorter construction than in Fig. 1, and the bar 11' of considerably greater length, this bar having a portion flat as indicated at 16, extending along the lower surface of the vehicle springs and passing over the ends of the leaves. A yoke 17 is illustrated as clamping the strap 6' to the vehicle spring and to the axle.

The action of the spring of Figs. 1 and 2 is substantially as follows:

When the spring is compressed by either holding the ends of the pins 2 and 2' substantially stationary, except for a sliding movement, and pressing up on the center of the spring, the spring is flattened thereby displacing the flange 8 and the washer 12 further apart and releasing the compression of the spring 14. This action takes place when a spring such as illustrated is attached to a vehicle axle and passes over a bump. As the spring reacts in the other direction it becomes flexed to a greater degree than the normal and than as illustrated in these figures. This action of greater flexing draws the flange 8 and the washer 12 closer together and compresses the coil spring 14 to a greater extent. The compression of the spring resists this flexing action and when the spring is completely compressed the unyielding resistance to extension of the engagement of the collar 8, the compression spring 14 and the washer 12 prevent any further flexure of the spring, therefore preventing further rebound and providing a snubber action.

The action of the spring of Figs. 3 and 4 is substantially the same, however, in this case instead of the strap 6' bending to follow the flexure or curve of the bending leaves of the spring, the extension bar 11' is formed with a flat section 16 so that it may conform to the bending of the leaves, otherwise the action is substantially the same.

It is manifest that the compression spring 14 may be designed and the relative position of the washer 12 to the flange 8 adjusted so that the resistance of the spring will function at any desired flexure of the vehicle spring and that the unextensible connection of the strap and the bar through the medium of the flange 8, the washer 12 and the compressed spring 14 may be so adjusted as to come into action at any desired flexure of the vehicle spring. Therefore my snubber not only acts to gradually retard the snubbing action but to absolutely prevent the reaction of the spring generally termed the rebounding, at any designated flexure thereof, thereby preventing to a great extent the breakage of springs of the leaf type which generally occurs on the rebound.

It will be noted that the elements of my snubber construction are somewhat strap-like in form and extend along the convex side of the multiple leaf spring. The coil spring is so positioned between the flange 8 and the free end of a rod-like structure forming the end of one of the elements, that on the greater flexing of the spring the tension of the coil spring increases. This action has a tendency to restrict the flexing of the vehicle spring. If desired the washer 13 may be adjusted so that the spring will be completely compressed after a certain flexure and thereby prevent further flexing of the spring, eliminating to a great extent the breaking of the individual leaves.

Another characteristic of my invention is that the clips around the leaf spring may be discarded as the strap-like structure of my snubber presses tightly against the convex side of the small leaves and holds same firmly in place, causing these leaves to flex with the main leaf.

In the structure shown in Fig. 1, the element 6 may be constructed of spring material and function as a leaf of the spring if desired.

Although my snubber is of a very simple character, it will be apparent that the general construction and details may be changed to adapt it to other types of springs than those shown. Such changes will be within the scope of my invention as set forth in the description, drawings and claims.

Having described my invention, what I claim is:

1. A snubber comprising in combination a multiple leaf spring with a main leaf and successively shorter leaves, the latter being on a convex side when flexed, means to bolt the leaves together at substantially one place, a snubber having a pair of strap-like elements bearing on the convex side of the spring with one end secured to the bolting means and its other end connected to one end of the main leaf, said elements bearing on some of the shorter leaves, one of said elements having a flange with an aperture therethrough, the other element having a rod extending through said aperture, and a compression spring between the flange and the free end of the rod.

2. A snubber comprising in combination a multiple leaf spring having a convex and a concave side, a pair of snubber straps formed of metal, means to secure one of said straps to a center securing device of the spring, means to secure one end of the other strap over one end of the spring, said straps being secured on the convex side of the spring, one of the straps having a flange extending outwardly from the spring with an aperture therethrough, the other strap having an extension extending through the aperture in the flange, and having a compression spring on said extension positioned between the flange and the end of the extension.

3. In the art described the combination of an axle and a spring shackle secured to a frame member, a multiple leaf spring having a center part bolted to the axle and the main part connected to the shackle, said spring being convex on one side, a pair of snubber straps, one of said straps being secured to the means bolting the spring to the axle, the other strap having its end connected to the end of the spring at the shackle, said straps being on the convex side of the spring, one of the straps having a flange extending outwardly therefrom with an aperture therethrough, the other strap having an extension extending through the aperture and with a compression spring coiled thereon between the flange and the end of the extension.

4. A snubber comprising in combination a multiple leaf spring supported to allow flexing whereby one side is convex when flexed, a snubber having a pair of strap-like elements bearing on the convex side of the spring and having their opposite ends secured to different parts of the spring, one of said elements having a flange with an aperture therethrough, the other element having a rod extending through said aperture, and a compression spring between the flange and the free end of the rod.

In testimony whereof I have signed my name to this specification.

IRA E. LITTEN.